US009960959B2

(12) United States Patent
Flacco et al.

(10) Patent No.: US 9,960,959 B2
(45) Date of Patent: May 1, 2018

(54) METHODS AND SYSTEMS FOR TRANSMITTING INFORMATION BETWEEN ELECTRONIC DEVICES

(71) Applicants: Michael Flacco, Seattle, WA (US); Nicolas Flacco, Seattle, WA (US); Cameron Colpitts, Seattle, WA (US)

(72) Inventors: Michael Flacco, Seattle, WA (US); Nicolas Flacco, Seattle, WA (US); Cameron Colpitts, Seattle, WA (US)

(*) Notice: Subject to any disclaimer, the term of this patent is extended or adjusted under 35 U.S.C. 154(b) by 114 days.

(21) Appl. No.: 13/923,278

(22) Filed: Jun. 20, 2013

(65) Prior Publication Data

US 2014/0068027 A1 Mar. 6, 2014

Related U.S. Application Data

(60) Provisional application No. 61/662,081, filed on Jun. 20, 2012.

(51) Int. Cl.
| | |
|---|---|
| *G06F 15/177* | (2006.01) |
| *H04L 12/24* | (2006.01) |
| *H04W 76/02* | (2009.01) |
| *H04L 12/28* | (2006.01) |
| *H04W 4/00* | (2018.01) |

(52) U.S. Cl.
CPC ........ *H04L 41/0803* (2013.01); *H04L 12/282* (2013.01); *H04L 12/2818* (2013.01); *H04W 4/00* (2013.01); *H04W 76/02* (2013.01)

(58) Field of Classification Search
CPC ... H04L 41/08; H04L 41/085; H04L 41/0803; H04L 41/0866; H04L 12/2816; H04L 12/2823; H04L 12/2803; H04L 12/2805; H04L 12/2818; H04L 12/282; H04W 4/00; H04W 76/02
USPC ............... 709/218, 220, 224, 228, 219, 221
See application file for complete search history.

(56) References Cited

U.S. PATENT DOCUMENTS

| | | | | |
|---|---|---|---|---|
| 8,599,776 | B1* | 12/2013 | Breau ............... | H04W 36/0022 370/329 |
| 9,237,211 | B2* | 1/2016 | Tabe ................. | H04M 1/00 |
| 2004/0113770 | A1* | 6/2004 | Falk ................. | G08B 13/19645 340/531 |
| 2005/0021773 | A1* | 1/2005 | Shiga ............... | G06Q 30/02 709/228 |
| 2007/0107020 | A1* | 5/2007 | Tavares ............ | H04N 21/43615 725/81 |
| 2008/0209034 | A1* | 8/2008 | Shin ................ | H04L 12/2825 709/224 |
| 2008/0240387 | A1* | 10/2008 | Murai ............... | H04M 19/04 379/110.01 |
| 2009/0228278 | A1* | 9/2009 | Huh ................. | G10L 13/043 704/260 |

(Continued)

*Primary Examiner* — Thu Ha Nguyen
(74) *Attorney, Agent, or Firm* — DWC Law Firm, P.S.; David Chen

(57) ABSTRACT

Various embodiments of methods and systems for establishing communication over a wireless communication network between a master device and a partial function device. The master device and partial function device can use a separate communication channel during setup or configuration for communicating over the wireless communication network. The separate communication channel can be, for example, an audio-based channel or optical-based channel.

5 Claims, 4 Drawing Sheets

(56) References Cited

U.S. PATENT DOCUMENTS

| | | | | |
|---|---|---|---|---|
| 2009/0262665 | A1* | 10/2009 | Kim | H04L 12/282 370/254 |
| 2010/0197218 | A1* | 8/2010 | Watanabe | H04M 11/025 455/3.05 |
| 2010/0217837 | A1* | 8/2010 | Ansari | G06Q 30/04 709/218 |
| 2010/0222110 | A1* | 9/2010 | Kim | G06F 1/1616 455/566 |
| 2010/0317420 | A1* | 12/2010 | Hoffberg | G06Q 30/0207 463/1 |
| 2011/0046798 | A1* | 2/2011 | Imes | F24F 11/006 700/286 |
| 2011/0267985 | A1* | 11/2011 | Wilkinson | H04M 1/2535 370/259 |
| 2012/0033559 | A1* | 2/2012 | Kim | H04B 1/18 370/241 |
| 2014/0279428 | A1* | 9/2014 | Holman | G06Q 20/10 705/39 |
| 2014/0286216 | A1* | 9/2014 | Park | H04L 5/0053 370/311 |
| 2015/0015369 | A1* | 1/2015 | Lamb | E05F 15/79 340/5.71 |
| 2015/0074259 | A1* | 3/2015 | Ansari | H04L 67/02 709/224 |
| 2015/0347683 | A1* | 12/2015 | Ansari | G06F 19/322 726/7 |
| 2016/0087834 | A1* | 3/2016 | Zhao | H04L 12/2807 709/220 |
| 2016/0170626 | A1* | 6/2016 | Fadell | G05D 23/1902 715/727 |
| 2017/0059197 | A1* | 3/2017 | Goyal | F24F 11/0086 |
| 2017/0344703 | A1* | 11/2017 | Ansari | H04L 63/0876 |

* cited by examiner

METHODS AND SYSTEMS FOR TRANSMITTING INFORMATION BETWEEN ELECTRONIC DEVICES

CROSS-REFERENCE TO RELATED APPLICATION(S)

This application claims the benefit of U.S. provisional patent application No. 61/662,081, filed Jun. 20, 2012, which is incorporated herein by reference in its entirety.

BACKGROUND

1. Technical Field

The present disclosure relates to wireless control and communications systems.

2. Related Art

Personal computing devices such as laptops, smart phones, and tablet computers ("smart devices") have evolved rapidly to provide users with easy and intuitive ways to communicate between smart devices. Over the past several decades, investment and innovation in communication networks has made instant worldwide communication a low-cost utility.

However, this communication relies heavily on a user configuring their device for communication, and using an intermediary to establish communication between two or more devices.

In the field of control systems, particularly home automation (such as X-10, Zigbee and Z-wave), it is particularly difficult to configure the system to operate in conjunction with other smart devices. This gives rise to an interesting paradox: It is very hard to build something to turn on a light in the next room from your phone, but it is easy to call someone on the other side of the world.

Established security protocols (such as WiFi's WEP and WPA2 standards) exist for wireless communications, but adding a simple home automation client device (hereinafter commonly referred to as "target device") on the network using these security protocols can be difficult. Most existing smart devices on the worldwide network include sophisticated input and output mechanisms (such as a keyboard, mouse, or touch screen). These I/O mechanisms make it relatively straightforward to configure a device for security because users are less likely to make errors entering security information and most devices on the worldwide network have multiple modes of feedback, such as a display screen, and speakers. For example, with a laptop, tablet or similar device trying to connect to a local WiFi network, it is assumed that a user will type in a WEP or WPA2 passphrase onto a physical keyboard or keyboard representation on a touch screen, and that the smart device will provide instant feedback about a potential problem in the case of typing error. Unfortunately, including such input/output mechanisms (such as a keyboard and screen) on common home, commercial and industrial electrical appliances (such as light bulbs, curling irons, kitchen appliances or automation robotic systems) is impractical and overly expensive, and this eliminates the feedback loop that users have come to rely upon to set up their smart devices on a wireless network.

At present, typical widely known configuration methods and systems for wireless devices without screens and keyboards (hereinafter also referred to as "partial function devices") involve the wireless device broadcasting its own wireless network in configured mode. A user wishing to configure has to connect to this network and then transmit the required information (e.g., ssid of the WiFi network to connect to, passphrase, etc.) and may do so using the user's computer, smart phone, etc., along with communication input devices such as a keyboard, keypad, or touch screen (hereinafter also referred to as a "full function" device).

Processors, wireless radio chips, and the supporting wireless protocols are becoming cheaper and more reliable to a point where they can be economically embedded in common devices, but setting up the security on these embedded wireless systems remains a challenge. Often, transmitting the network name and associated passphrase or pass code remains a weak point in an automation system. On many current automation systems, this introduces a feedback delay in which a user can not be immediately informed of a setup error because the client must close the setup connection, and attempt to open the automation connection. For example, if a user miss-types a wireless network name or password, he will not know about the error until the target device opens back up the original communication channel.

Furthermore, when simple network-enabled devices lack keyboards and visual displays, it becomes much more difficult to troubleshoot what went wrong when the device cannot connect. When it becomes necessary to call a support line or interact via some other communication channel with a support person, that support person can have a difficult time ascertaining the cause of the setup problem.

BRIEF SUMMARY

Some embodiments of the present disclosure provide a system for controlling a plurality of target devices. The system comprises a target device, and smart device, each having wireless communication components and a processor for communicating with each other in a wireless communication network. The smart device, which can be full function master device, is used to control a state of the target device, which can be a partial function slave device, through the wireless communication network. A client application can be provided on the smart device operable for use in transmitting setup information to the target device for communication on the wireless communication network. Also, a separate communication channel, separate from the wireless communication network, is provided for use in transmitting information between the target device and the smart device regarding the setup information.

The separate communication channel can be an audio channel, or an optical channel (e.g., light). Also, the information transmitted on the separate communication channel can be feedback information regarding a status of enabling the target device to communicate with the smart device on the wireless communication network.

In some embodiments, the system includes a plurality of target devices, and each target device comprises an independent power plug, each with at least one outlet socket which can be connected to another target device that has been set up for communication over the wireless network. The previously set up target device has been encoded to transmit the setup information to the another target device using a signal over power protocol, and the another target device can decode the transmission and thereby also be set up for wireless communication with the smart device.

In some embodiments, the separate communication channel is an audio channel and the information transmitted on the separate communication channel can be embedded into another sound signal conveying an audible song or linguistic phrase without obscuring or disturbing the song or phrase from being detected by human ears.

Various embodiments of methods carried out by the various system embodiments are also disclosed herein.

BRIEF DESCRIPTION OF THE DRAWING(S)

DETAILED DESCRIPTION

In the following description, certain specific details are presented in order to provide a thorough understanding of various embodiments of the disclosure. However, upon reviewing this disclosure one skilled in the art will understand that the disclosure may be practiced without many of these details. In other instances, well-known structures, systems and methods associated with computers, wireless devices and networks have not been described in detail to avoid unnecessarily obscuring the descriptions of the embodiments of the disclosure.

In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, and these terms and variants thereof are intended to be construed as non-limiting. Headings used below are not intend to be limiting.

Figure 1:
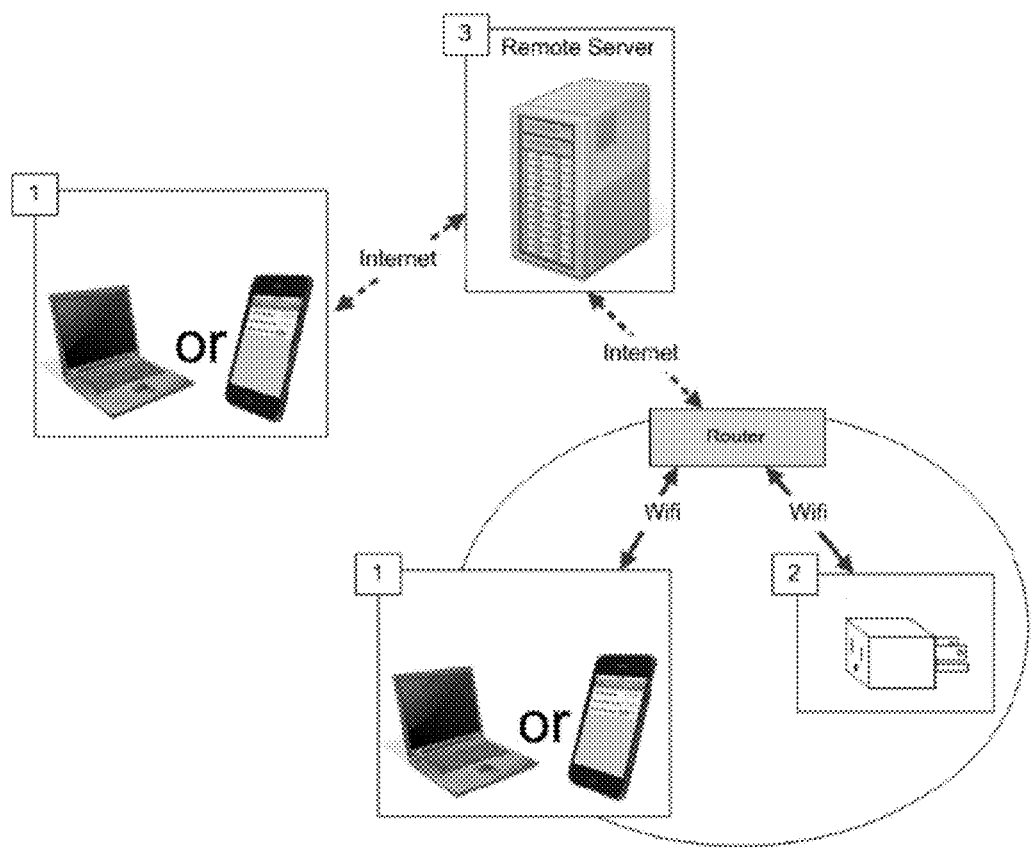
FIG. 1 is a simplified overview diagram of a system for some embodiments of the present disclosure.

As shown in FIG. 1, in some embodiments of the present disclosure, systems are provided comprising at least one remote server 3, a target device 2, and a client application stored on a user smart device 1 (e.g., computer, smart phone, tablet, laptop, etc). One important feature of the smart device is a reliable means for a user to input data, such as a keyboard touch screen, or voice recognition. In some embodiments, the system can enable a user with access to a smart device to install the client application on the smart device, and with it, control, monitor and share target devices with other users who also possess a smart device with a compliant client application installed.

In some embodiments, just a target device 2 and smart device 1 are provided without connection to any wireless or wired internet infrastructure. Under this circumstance, the smart devices are forced to communicate with the target device over an alternate communication channel, but it should be noted that a careful use of other input and output functions on both devices can facilitate real-time transfer of information.

Client Application

Figure 3:
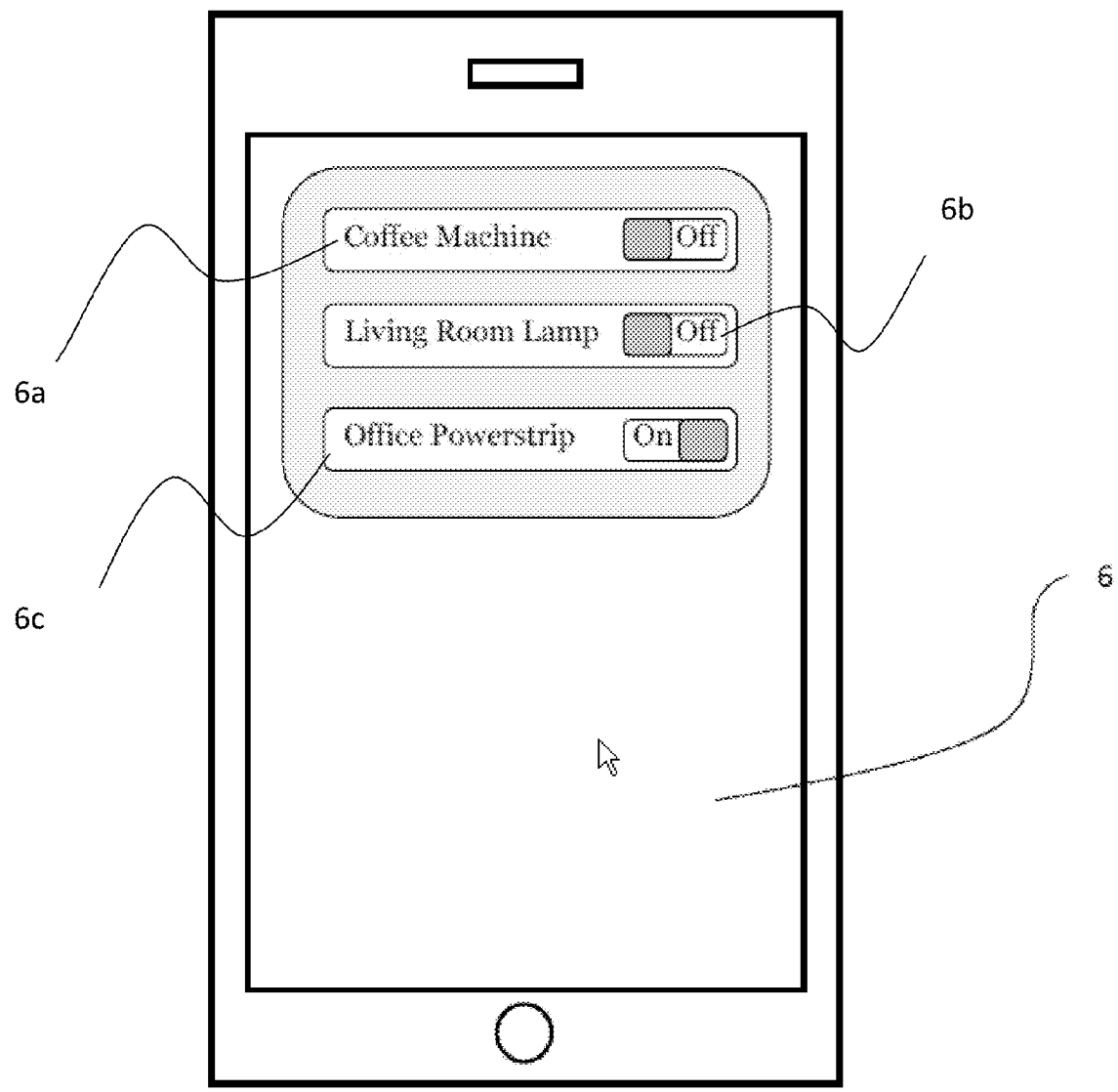
FIG. 3 shows an example graphical user interface display for use with some embodiments of the present disclosure.

In some embodiments, the client application can be loaded on a memory of a smart device 1, and can provide instruction to the smart device processor. The client application can, among other things, drive the display of target devices 2 on a graphical user interface of a user's smart device, by showing indicia 6a, 6b, and 6c (e.g., names given by the user for target devices) representing target devices 2 associated with the user to allow a user to control the target devices. The graphical user interface could display control graphics, such as, for example, graphical buttons for turning the target device or off, as shown in FIG. 3.

The smart device 1 can be connected to a wireless network, and can be, for example, an 802.11 Wi-Fi, or BlueTooth enabled smart mobile phone, personal computer, or other smart device. In some embodiments, the client application can perform at least three tasks: target device installation, target device control and monitoring, and target device configuration. Users can interact primarily with the client application so the functions of the client application can largely dictate how users interact with the system. In some embodiments, among the only times a user will not interact directly with the client application is when a physical hardware reset is required, although the system can be configured to offer a remote reset function that should typically obviate the need for direct interaction with the physical user device.

During installation, the client application can automatically sense user target devices 2 that are unable to connect to the application user's wireless network, and prompt the application user to provide the information necessary to connect the user's target device 2 to the wireless network. Typically this occurs when the target device 2 that is unable to connect to a wireless network itself becomes an association point or network beacon with certain characteristics (such as network name) that the smart device can sense via its built-in wireless sensors. During setup, in some embodiments of the present disclosure, the client application can maintain a real-time feedback loop with the target device via a second communication channel, such as sound, light, vibration, or a other separate wireless protocol channel. If the target device 2 cannot connect to or configure itself on the wireless network, it can immediately send back an encoded indication of what went wrong, which can then be instantly shown on the client application to the user.

In some embodiments, the client application has the ability to automatically discriminate between different types of user target devices 2 that are not connected to the wireless network, and display them separately, on a graphical user interface. This can be achieved by having the client applications actively query the user target devices that need to be set up, or by having the user target devices create networks with default names that the client applications can decipher as a certain type or class of device.

Figure 2:
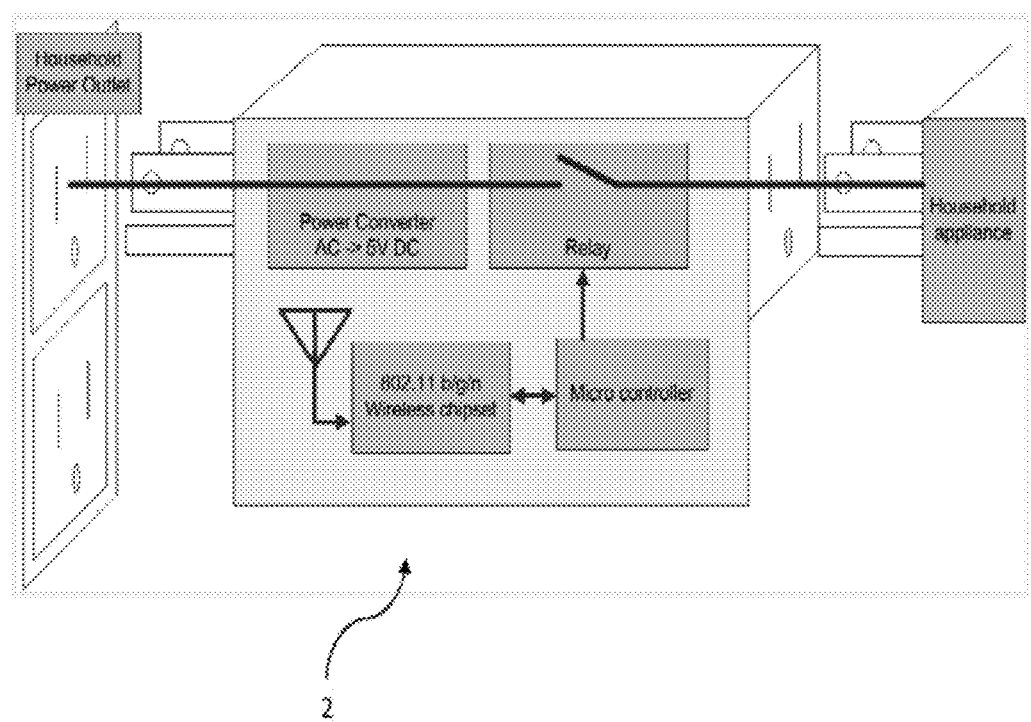
FIG. 2 is a simplified diagram of the target device of FIG. 1, in the form of a power plug.

As shown in FIG. 2, the target device 2 can be, for example, a power plug having wireless communications capability, and switch components, which can be comprised of, among other things, a processor (e.g., microcontroller), relay, motor, sensors, and/or other controllable components. In this example, any of a variety of appliances or other electrically powered devices, equipment or machinery, or other electrical devices, can be connected to a power source, such as a household power outlet, via the power plug target device 2, and the target device can be controlled and/or monitored remotely to supply or shut-off power to the connected electrically powered device, or monitor the electrically powered device's power use or state of operation. Under this configuration, the client application can have a two-way communication channel open with an arbitrary number of target devices such that both control and monitoring can be provided for each device. It should be noted that if the client application has access to the Internet, it can also inform the remote server 3 of any state change or device configuration change. As will be appreciated by those skilled in the art after reviewing this disclosure, keeping the remote server 3 informed of target device 2 state changes can help ensure that multiple client applications that have access to a single target device continuously and accurately display each target device's true state.

In some embodiments, after the user target devices 2 connect to the user's wireless network, the client application can automatically display installed target devices as indicia 6a, 6b, and 6c, on the graphical user interface 6 and allow direct user control and configuration of the target devices. Referring to FIG. 3, the target devices can each be given a unique name to be displayed on a display of the user's smart device. Each client application can sense whether it is connected to the same local wireless network that the user target devices are connected to, and be able to change its behavior appropriately. For the sake of low latency performance, both the client application and user target devices can have the flexibility to communicate in different modes that optimize bandwidth use and latency under different circumstances. For example, if the client application is connected to the same wireless network as the user devices, the client application can send control and configuration commands directly to user devices, without sending the primary message to the remote server 3, which can result in lower latency performance. In this case, the target device 2 can execute a method to keep the remote server 3 and client application in sync, and forward any command to the remote server, if possible. If the target device 2 and client application are not connected to the remote server 3, a method can exist to re-establish synchronization with the remote server upon reconnection, as will be appreciated by one skilled in the art after reviewing this disclosure. One way to do this is for both the remote server 3 and target device 2 to store the time of the last command received, and upon connection, resolve the system state according to the last received command. If the target device 2 stores a more recent command, then that command will take precedence and update the remote server 3. Otherwise, the remote server's 3 most recent command will take precedence, and the target device 2 will change its state according to the remote server's 3 stored command.

If the client application is not connected to the same wireless network as the user devices, several methods of command propagation can be available and may optimize bandwidth and latency performance. In some embodiments, the client application can send commands to a remote server 3. The target device 2 can periodically query the remote server 3, such as in circumstances in which the target device loses connectivity. In other embodiments, a direct communication link can be established between the client application and the user target devices 2, outside of the local wireless network. In some embodiments, from the user's perspective (e.g., how the user interacts with the user interface of the client application), the client application will work identically regardless of whether or not it is connected to the same wireless network as the user devices. The choice of which method to use to implement non-local monitoring and control can depend on a combination of which option optimizes security, bandwidth use, processing overhead, and/or system complexity. It should be noted, however, that periodic polling by the target devices can add to network traffic and system latency. The system latency would be due to both additional traffic on the network, and the period between periodic polling messages by the target devices.

In some embodiments, the client application on the smart device 1 can verify the identity of the user. Several well well-established methods of identity verification exist, such as a login and password, fingerprint or voice recognition, or something similar. A further level of security can be achieved by using encryption algorithms to prevent third parties from intercepting or faking network data packets.

In addition, standard database security measures can be used to prevent unauthorized users or entities to gain access or control to the states of user devices. Such measures can be employed for reasons such as, for example, preventing abuse of the system or unauthorized control of user target devices.

In some embodiments, control commands will change target device 2 states (e.g., on or off, high or low, or any other of various possible state changes), while configuration commands will allow application users to change target device 2 name, location tags, add any user target devices that a different application user installed, and other commands that do not directly change target device output state. A standard protocol can be used to send, receive and verify that the client application or user target device 2 successfully sent a command. In addition, client applications can offer users the option to update target device firmware when it becomes available. Updating target device firmware will enable, among other things, the client applications to offer new functionality to users or improve security.

Target Devices

Target devices 2 can provide power switching, media routing, sensing, or any of numerous other operations that an application user wants to control, monitor, or manage. In some embodiments, the target device 2 can, among other things, acquire information from broadcasting an ad-hoc wireless network, listen for control and configuration commands from application clients on the same wireless network, and query a remote server 3 for, or otherwise receive from a remote server 3, control and configuration commands from application clients that are not connected to the same wireless network.

In some embodiments, during installation of a target device 2, each target device can broadcast an ad-hoc wireless network with which a client application (e.g., executing on a smart device) can open a socket connection. With the open socket connection, the target device will receive information from the client application that the target device can use to connect to a user's wireless network selected by the user. The type of wireless network connection can be any of many, such as, for example, an 802.11 WiFi network, BLUETOOTH connection, or 3G wireless connection. In this context, an ad-hoc network is broadly defined as a network that is not connected to the Internet, but one to which other wireless devices can connect to and use to transfer information.

After installation, each target device 2, can simultaneously listen for client applications connected to the same wireless network as the target device (e.g., local users), and either query a remote server 3 or listen for commands from the remote server 3 that originate from client applications that are not connected to the same wireless network as the user smart device (e.g., remote users). By listening for commands from local users on the local area network, the target device can minimize latency (e.g., about several milliseconds or less) during control for users on a local area network. By querying the remote server 3, the target device can also receive control commands, but such control can involve longer, or significantly longer, latencies. Many applications (such as home appliance control) will require very low latency performance to be acceptable to users.

In some embodiments, target devices 2 are well suited for helping track and manage energy consumption, either on behalf of consumers, or third parties, or both. This can be achieved either by connecting the target device wirelessly to a smart meter that a utility (for example) can monitor, or by connecting the target device directly to a utility's remote server, or having the remote server 3 communicate with the utility's remote server directly. A protocol or interface can be provided that provides third party entities, such as, for example, power companies or appliance (or other device) manufacturers access to the state of individual target devices.

With such a connection, third parties and/or consumers could actively regulate real time energy consumption to meet certain optimized conditions. For example, a consumer or business might want to minimize electrical cost by using power during non peak billing hours. This could be achieved by giving control of certain non-vital target devices 2 to a utility, or allowing a utility to send information such as real time power rates to such target devices 2. When a user uses such target devices 2, the utility could warn the user that power is more expensive, and the consumer could opt to delay use of that target device 2. Similarly, target devices 2 could include an option to delay operation until real time power rates come down below a threshold set by a user or the utility. From the point of view of a power transmission or distribution operators, integrated target devices 2 might reduce power purchases on the open market by enabling them to throttle power to individual devices during times when power production capacity was at risk of falling short of demand (or falling short of a certain threshold as a percentage of total capacity). In addition, a grid operator might want to signal the availability of excess capacity, perhaps due to unpredictable renewable sources, such as wind energy, in order to minimize unused capacity. This could be achieved by enabling the power operators to inform client applications that additional power capacity is available. Such an indicator could be achieved via a indicator that shows through color and/or shape, whether the current time is a good time to consume energy.

On a high level, target devices 2 that can be monitored and controlled from remote servers 3 could enable more elastic demand in the electric power markets. The ability to actively manage both electric supply and demand could enable a more reliable, robust grid that is less susceptible to outages, and is more efficient in terms of capital utilization.

In order to avoid target devices receiving conflicting commands from a client application connected to the same wireless network as the target device 2 and commands from the remote server 3, the remote server can be alerted of any command from client applications connected to the same local area wireless network as the target device 2. Either the client application, or the target device itself 2, or both, can send update command messages to the remote server 3.

As will be appreciated by those skilled in the art upon review of this disclosure, many local area networks have firewalls and other well established security measures that can make propagating commands from outside the local area network to the target devices 2 problematic. Thus, in some embodiments, target devices 2 can send queries out to a remote server 3 from within the user's secure wireless network to check for command updates. As such, part of the security the system offers will depend on the security of the wireless network that the user has set up. That is, in some embodiments, the target device can sense the security configuration and automatically adjust its protocol to query the remote server 3 if necessary to receive commands from the remote server 3. Also, the target device 2 can be equipped to communicate over a cellular network to establish communication with the remote server 3 independently from a local area network.

In some embodiments, target devices 2 can also have the ability to accept firmware updates. Client applications on smart device can ask users for permission to update their target devices' firmware. If a user approves firmware updates, the client application can manage firmware updates to one or more of the user's target devices, which may be selectable by the user, connected to the local network. As user demands evolve and new types of configuration and control become desirable, the target devices can be remotely reprogrammed to respond to new commands or communicate with a changed or expanded communications protocol. This flexibility can enable new functionality to be added to existing target devices, and new types of target devices to be introduced without rendering existing user devices obsolete.

Figure 4:
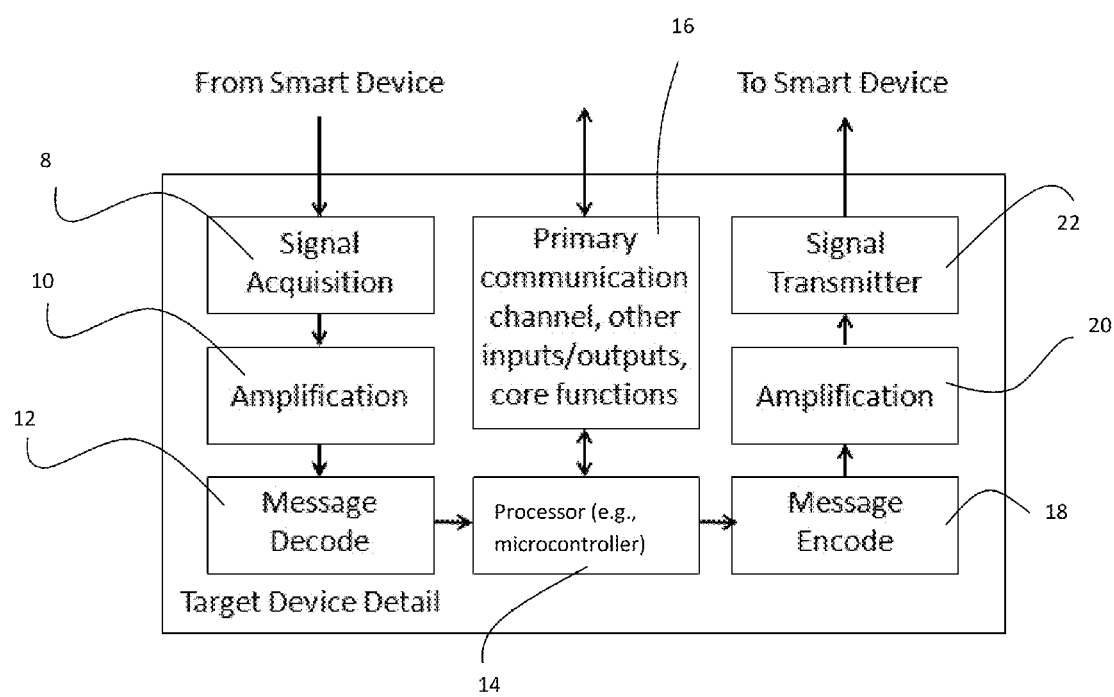
FIG. 4 shows an example implementation for the inside of the target device of the present disclosure, including an independent communication channel.

FIG. 4 showing a embodiment of a signal processing system for a target device 2 of the present disclosure, suited to facilitate a communication channel separate from the core communication channel (commonly wireless). A signal is acquired at a signal acquisition unit 8, such as a microphone, light or vibration sensor that collects a signal from the smart device. Then, the target device filters and amplifies the signal through an amplification unit 10. The signal is then sent to a decoder 12. The decoder translates an analog signal from an analog signal (with any standard or proprietary protocol) into digital signal or any a signal that the microcontroller 14 can otherwise process. If the microcontroller senses something from the signal acquisition block or primary communication channel 16 (e.g., radio wave based, such as 802.11 WiFi network, BLUETOOTH connection, or 3G wireless connection) that warrants a response independent from the primary communication channel, it can encode a response message (or initiating message) at the message encoder 18, and amplify it through an application unit 20, and send it over a signal transmitter 22. It should also be noted that for certain embodiments of this design, the signal transmitter 22 and receiver could be the same element, and a multiplexer could be used to switch between listen and speak.

Remote Server

The remote server 3 can act as, among other things, a communications conduit between remote client applications and target devices 2 on the local wireless network. As such, in some embodiments, the remote server 3 may be required to perform at a minimum these tasks:

a) maintain the states of all target devices in the system and associated data, such as timers associated with a target device and power consumption data.

b) provide client applications with all information on the target devices registered with that particular client;

c) communicate any changes (state, name, timers or other) a user makes to a target device to the target device itself as well as to other users of this particular target device;

d) notify the users of a target device if the target device is not communicating with the server;

e) maintain a persistent connection for real-time communication with all target devices; and f) asynchronously transmit information from target devices to client applications, such as, for example, power data or possibly a button press on the target device itself that can change the state without requiring the user to use a client application to do the state change.

Both remote client applications and target devices 2 can update the remote server via control and configuration commands to ensure that the remote server 3 remains in sync with target device states or undesirable conflicting commands may arise. A message protocol can ensure that communications are flexible, low latency, and reliable. Since user behavior is unpredictable, the protocol can allow arbitrary amounts of information to be sent. In addition, the protocol can allow for automatic network optimization routines that prevent a server overload, and maintain acceptable user latency. Finally, the protocol can take advantage of verification mechanisms to ensure that messages were accurately transferred, as will be appreciated by those skilled in the art after reviewing this disclosure. In some embodiments, the system (remote server 3, target device 2, or client application on the smart device 1, depending on which component becomes aware) can notify users when users send conflicting/contradictory commands and can prevent the system from failing or going into a two-state mode. In a preferred embodiments, there is one true state for every target device.

For some embodiments, the remote server can be thought of as having at least four components, security systems notwithstanding:

a) system that handles persistent connections of target devices and certain clients b) system that handles periodic data requests from certain clients c) a common interface (API) that defines what messages the system accepts and what these messages do d) a database that stores the state of target devices and in general maintains the true state of the entire system.

The remote server is not necessarily a single machine, but can be a cloud based service that embodies the functionality described above across a plurality of individual servers.

If a local client application is not present within range, a target device 2 can periodically query the remote server 3 to see if its state has been changed by a remote client application, or alternatively the remote server can rely on push notifications or persistent sockets to handle real time updates. In this case, the remote server 3 can reply to state requests. The periodicity of target device queries can be automatically changed as a function of network traffic (e.g., the frequency of queries can be adjusted downward as traffic increases, and vice versa). In the case of persistent sockets, the remote server's 3 socket server can also use schemes that prioritize different types of system commands while sending packets over sockets that optimize system performance. For example, user application state change commands might be prioritized above state queries to improve system latency.

In some embodiments, the remote server 3 stores real time state information of target devices 2, along with application user information that associates each target device with an application user account. In some embodiments, at a minimum, the remote server will store information such as user identification information, target devices associated with the user, and each target device's state.

In some embodiments, the systems and methods of the present disclosure can omit the remote server 3. In particular, in some embodiments, only a local network is used to communicate between a client application and a target device. This can provide the user with flexibility to use the system in various ways. For example, by eliminating remote server connectivity, the level of system security will depend on the strength of the local wireless network security. Indeed, in some embodiments, a user can select to discontinue communications with a remote server 3 and utilize only a local area network for communication between target devices and client applications, such as, for example, if security is a concern.

Client

In some embodiments of the present disclosure, a system and method is provided for use in installing a controlled, or controllable, target device on an existing wireless network. The network may be, for example, an 802.11 network, BLUETOOTH, or 3G cell network, or something similar. The method can include an active, user-initiated series of steps (which may involve a small number of discrete steps initiated by a user), and an automated action, or series of automated actions, in which the user does not need to do anything. After the target device is installed on the wireless network, a user can use his or her phone (or smart device, which may be a laptop, tablet, etc.) to communicate with, or control the target device.

In some embodiments, the first active step user takes to set up the system is to power on the physical electronic device (target device 2) and initiate or open the client application (e.g., control software application). Powering on the target device 2 can consist of plugging the target device into a standard wall outlet, and switching on the target device (if appropriate), or it can consist of plugging the target device 2 into an AC/DC power supply that will power the device. In parallel with the first step the user can initiate or "open" a software application on a smart device (e.g., smart phone, laptop, or any other smart device that contains a user interface that supports text input and has access to networking assets, such as an 802.11 radio, BLUETOOTH radio, or cell phone radio). Text input can be via a standard keyboard, touch screen, or a voice interface that can transcribe a user's voiced commands into text.

In some embodiments (depending on the smart device's capabilities), a second active step the user can take is to wirelessly connect the smart device 1 to the target device 2, by making appropriate selections using input members and view a display screen on the smart device 1, as will be appreciate by those skilled in the art upon reviewing this disclosure. In a connected state, the smart device will be able to freely send the target device 2 information via packets or whatever other wireless standard has been established. The requirement of whether or not the user needs to manually connect to the target device 2 depends on the capabilities of the smart device 1. For example, some smart devices, depending on operating system, will allow application controlled connections to the target electronic device which makes this step unnecessary, while other smart platforms require the user to manually switch (e.g., by selection using a graphical user interface and input member of the smart device) to the target device's wireless network.

In some embodiments, the third and final step the user will take to set up the target electronic device on the user's wireless network is to send the target electronic device the information necessary for the target electronic device to connect to the user's wireless network. In the case of an 802.11 network, this information can consist of a network name (e.g., SSID) and passphrase. Some modern embedded wireless systems can automatically detect what type of authentication and security a wireless network is using, so it is not necessary for the user to enter the type of authentication. Other types of wireless networks (such as, for example, BLUETOOTH or 3G networks) may require other information to enable the target electronic device to connect. In some embodiments, after sending the information necessary to connect to the user's wireless network to the target electronic device, the remainder of the method steps are automated. Upon successful setup, the application will display the target electronic device by, for example, indicating its state, name, and any other relevant information on a display of the user's smart device, with the target device being enabled for control through the client application.

In some embodiment, in the case of failure to set up the target electronic device due to, for example, mistyping information, or a faulty wireless connection, the target electronic device can revert to its original un-configured state, and the client application can detect and indicate the source or cause of the failure and instruct the user to try to set up the target device again, and provide (display or otherwise indicate) to the user the potential source or cause of the failure by, for example, reminding the user to double check a particular step in the setup process that may be related to the source of the failure. Steps that can go wrong include, but are not limited to: failing to power on a target device, mistyping the user's wireless network name, mistyping the user's wireless network passphrase, or having a wireless network that has controlled access. In any of these error cases, the user can receive feedback that can be used to avoid errors on subsequent setup attempts.

Automated Set-Up Process

In some embodiments, there are three parts of the automated portion of the system: the target device 2, the client application on the smart device 1, and a remote server 3, all of which may work in concert to provide the user an easy, secure way to set up the target device.

The processor (e.g., microcontroller) of the target device 2 may detect whether or not it is able to connect to the user's wireless network by, for example, scanning all the available networks, and matching the scan results to a list of stored networks. If it is unable to find a match in the scanned networks and is unable to connect to the user's wireless network, the target device 2 may automatically become a network node itself, or enter a mode in which the client application can wirelessly connect directly to the target device. A network node may allow a smart device to connect to it and transmit information both ways as will be appreciated by those skilled in the art after reviewing this disclosure. The smart device 1 and target device 2 can use any network protocol, such as, for example, wi-fi, BLUETOOTH, 3g, 4g, as long as the protocol allows two way information transfer. The ability for the target device to automatically configure itself to allow the client application to directly connect can be necessary to provide the user's client application a conduit to set up the target electronic device. In addition, in the case where the target device sets up an independent network node, the target device may be pre-equipped with sufficient firmware instruction to avoid redundant network node names by scanning the existing names of wireless networks, and automatically changing the default name of the network name to something unique.

In some embodiments, after the target device 2 has received information to connect to the user's wireless network, and has succeeded, it can automatically connect to a remote server 3 via the internet. Once connected to the server on the internet, the target device can automatically send a message that uniquely registers itself in the remote server's 3 database (which can include at least a unique identifier for the target device and the smart device of a user that set up the target device). This functionality can be necessary to enable the target device 2 to be automatically displayed on a client application on the smart device 1 after the user has finished the user's active portion of this set up method. That is, the user can then obtain or receive status information for the target device from the server, and can have access to control the target device via the server 3.

After registering with the remote server, the target device itself maintains a state that supports the real time reception and transmission of asynchronous data with respect to the remote server 3. This can be achieved in various ways. For example, real time persistent communication can be achieved via push notifications from the remote server 3 to the target device 2 and client application on the smart device 1. Second, persistent socket connections between the remote server 3 and both the target electronic device 2 and smart device 2 can be maintained. Or, third, the persistent real time connection can be achieved via periodic polling method in which the target electronic device or smart device application periodically connect and query the remote server for updates.

In some embodiments, the client application on the smart device 1 must support the ability to connect to and receive information from both target devices that have not been set up, and the remote server. After connecting with the target device 2, the client application can prompt the user for the information needed for the target device to connect to the user's wireless network. It should be noted that some smart devices support applications that can automatically detect and connect to multiple wireless networks. In this case, all wireless network management is handled automatically, which leads to the desirable outcome in which the user does not have to manage switching between wireless networks at all.

After prompting the user for information to connect to the user's wireless network, the client application can send this information to the target device 2 along with the user's unique identification information. In certain embodiments, the client application may check for uniqueness of a user's desired identification information. The client application can then wait for confirmation from the remote server 3 that the new target device 2 has successfully been registered with the remote server 3. If the set up process is successful, the new target electronic device can be monitored and controlled by the user.

If the process fails, the client application on the smart device 1 can inform the user the next time the same target device 2 is being set up as to what may have went wrong the first time, and recommend a fix, as will be appreciated by those skilled in the art after reviewing this disclosure. This functionality can minimize user frustration, and enable problems to be fixed without external intervention.

In some embodiments, the smart device client application can easily switch between wireless networks being accessed because such a functional feature can enable the client application to both guide the user through the active set up steps, and keep the user aware of what the target device 2 is doing after the user has finished executing the active set up steps. Both guidance and feedback are necessary to this method, and the ability for the smart device application to connect to multiple sources of information allows this.

Finally, although the remote server 3 is not visible to the user, in some embodiments, it enables the client application on the user's smart device 1 to communicate with the target device 2. The first time the remote server 3 receives a connection from a target device 2, it can (a) add the target device's unique identifier to its database, and (b) send a message to the smart device 1 client application, notifying it that a new target device with a given unique identifier has been added to the system. In some embodiments, the target device's initial message to the remote server includes a unique user identifier, identifying the smart device of the user that that set up the target device. With this user identifier, the remote server is aware of which user set up the device, so it only sends a notification to the smart device of the single user who set up the target device.

The client application on the smart device 1 can support sharing between different users so that multiple users having different smart devices can monitor and control any particular target device 2. This can be facilitated in the remote server by keeping track of which target devices are associated with which users, and allowing a single target device to be associated with multiple users. An association between a target device and user smart device, can be created by sending to the remote server, from the smart device 1, a message indicating that a new specified user be henceforth associated with a target device with a given unique identifier. When a device is shared this way with a new user, the new user will receive a notification from the remote server about the target device's existence, and that new user will then be able to monitor and control the target device.

In some embodiments of the present invention, the following steps may be executed:

(a) the target device 2 broadcasts a network which is accessible by a locally positioned user smart device;

(b) the smart device detects the network and the client application signals the target device to enter a setup mode;

(c) in the setup mode, the target device sends information identifying the networks it has detected to the client application via the smart device;

(d) the client application then either automatically, or by prompting the user to provide information, directs the target device to access a network by providing particular network information (e.g., network name (e.g., SSID) and passphrase);

(e) the target device then connects to the specified network, and then accesses a remote server 3 through the specified network to the Internet, and registers with the remote server (which may include providing a unique identifier for the target device and a unique identifier for the smart device associated with the user that initiated setup for the target device); and (f), the remote server notifies the target device to confirm registration and notifies the smart device of the registration of the target device.

Additional Setup Methods, Systems and Devices

In some embodiments of the disclosure, the system comprises at least three components: A smart device 1, a target device 2, and a common information protocol. Both smart device and target device can contain transmission and receiver elements that may include a combination of a speaker, microphone, light emitting device such as a light emitting diode, and/or light sensor. Using physical proximity as a security method, the two devices can transmit information via the common information protocol by light or sound, without any need to pre-configure the communication channel. Since it is a separate communication channel, the client can also give the smart device instant feedback if something goes awry. Furthermore after a successful set up, additional target devices may be connected to the first target device to automatically propagate the setup information among an arbitrary number of additional target devices.

Master Device (Smart Device)

The smart device can be any electronic device with a processor, a wireless radio, a display, and manual input mechanism, such as a keyboard or touch screen, and either:

A speaker/microphone pair, or

A light emitter/light detector pair (including a camera)

Vibration actuator/motion sensor or accelerometer to detect

Common examples of the master device include laptops, smart phones, tablet computers, and desktop computers.

Target Device

The target device can be any electronic device with a processor, wireless radio, and either:

A speaker/microphone pair

A light emitter/light detector

Vibration actuator/motion sensor or accelerometer

Protocol

The information transfer protocol can be any means to reliably transmit and receive digital information via light, sound, vibration or other method. Various standards exist which may be employed for some embodiments of the present disclosure through license or otherwise, such as, for example, DTMF signaling in telecommunications or a commercially available/licensable sound-based protocol used by CHIRP™, an application available for iOS devices.

The video target device setup can use the optical flash and video camera of a smart device 1 to send and receive information from a target device 2. The target device 2 can use a light emitter and light sensor to send and receive (e.g., using different color frequencies to represent the difference between sending and receiving, or to provide information redundancy or multi-channel communication). The target device and smart devices can therefore use their WiFi connection independently, and the user gets real time feedback. Depending on the implementation of the target device, an LED could be structured for use as both the emitter and the receiver via time multiplexing. On the app side (e.g., client application on the smart device), the application can be, for example, a game-like interface to improve the setup experience.

In the audio embodiments of the target device, setup uses sound to transfer information between smart device 1 and target device 2. One possible protocol is the DTMF protocol. In some embodiments, the information bearing sound is embedded into another signal, such that one can transmit information without disturbing the auditory features that a normal human could detect. In this way, the smart device could be able to play a specially watermarked song or phrase that would set up the target device. The target device would require extra hardware (such as a microphone and a small speaker) but this solution is economically feasible on the app and firmware and it does not require line of sight. Two plugs (e.g., target devices 2) could also talk to each other video audio if they are plugged into each other or next to each other.

To set up additional target devices once a single target device is set up, one could either use signal over power, or re-use the video, sound or vibration mechanism. With signal over power, the target device could, for example, add a signal above the 50 Hz or 60 Hz that other target devices could detect and decode to be set up. The additional signal could either be added on the existing infrastructure lines, or just to the output of the target device if it also had a power output. In the latter case, a target device to be set up could be plugged into the target device that was already set up to propagate the setup information. With video or sound or vibration, the target devices that have not been set up would use the same protocol that the first target device used to set up.

To trigger setting up additional clients from a client that has already been set up, the target device could either be triggered from a smart device, or via a mechanism built into the target device itself, such as a button.

Certain mobile operating systems (IOS) restrict the ability of the app designer to manage network connections. This creates at least three related problems for users of an automation system while setting up an the automation system target device or power plug from an app.

1) To connect to an ad-hoc wireless network generated by a target device, the user needs to exit the phone app, change the wireless network manually, and then manually switch back to the app. From the user experience point of view this is extremely undesirable.

2) Now that the app is on the same network as the plug, it transmits setup information, specifically WiFi credentials that allow the plug to access to user's WiFi network. The plug has to stop broadcasting its ad-hoc WiFi network in order to attempt a connection to the user's WiFi network. This means that if a problem occurs, such as the user miss-typing a password, the user gets no immediate feedback. Instead, all the target device can do is indicate (after a delay) that something went wrong, but due to a lack of a second communication channel, it can not inform the user what went wrong. From a user's perspective, this can be both time consuming and perplexing.

3) Each plug requires setup independently, which is not what one would expect from a user friendly automation system.

In some embodiments of the present disclosure to, among other things, address problems #1) and #2) above, a communications channel can be provided that is independent of WiFi that overcomes the problems of Bluetooth, such as, audio or video. To address the problem #3), either one plug can be plugged into another to transmit WiFi credentials mixed in with the power signal of the plugs (on a frequency different than that of the power signal) or an audio signal method and system can be used.

These methods/systems can impose some extra requirements on the target device (e.g., plug) hardware, such as, for example, a speaker/microphone, analogue to digital converter(s), and circuitry for writing and reading information to the power signal, as well as the firmware and app software. However, they can be significantly more economical and easier than using Bluetooth. Also, the un-configured target device could use its pre-stored server public key to encrypt its unique id, version information, information about who and what app is trying to set it up, and transfer this to the already configured plug, which broadcasts this information to the server. The server could then verify this information and give the configured plug approval to share its WiFi credentials with the un-configured plug.

Although specific embodiments and examples of the disclosure have been described supra for illustrative purposes, various equivalent modifications can be made without departing from the spirit and scope of the disclosure, as will be recognized by those skilled in the relevant art after reviewing the present disclosure. The various embodiments described can be combined to provide further embodiments. The described systems, graphical user interfaces, devices and methods can omit some elements or acts, can add other elements or acts, or can combine the elements or execute the acts in a different order than that illustrated, to achieve various advantages of the disclosure. These and other changes can be made to the disclosure in light of the above detailed description. The Summary section of this specification is not intended to identify key features or essential features of the claimed subject matter, nor is it intended to be used as an aid in determining the scope of the claimed subject matter.

What is claimed is:

1. A method for communicating with a target device on a wireless network comprising the following steps:
   transmitting access credentials for the wireless network between a smart device and the target device through a different communication channel that is different from the wireless network, the different communication channel being established by visible light emitted from a lighting source on the smart device, sound emitted from an audio speaker of the smart device, or vibration caused by a vibration actuator of the smart device;
   connecting the target device to the wireless network using the access credentials received from the smart device through the different communication channel; and
   after connecting the target device to the wireless network, using the wireless network to transmit control information from the smart device to the target device to control a state of the target device.

2. The method of claim 1 wherein the sound source is an audible sound.

3. The method of claim 1 wherein the different communication channel is established by sound emitted from an audio speaker and wherein the access credentials for the wireless network are embedded into audible music or a linguistic phrase.

4. The method of claim 1 wherein the target device comprises a power plug and outlet power socket, and wherein another target device comprises a power plug and outlet power socket, and further comprising connecting the target device and the another target device together for power transmission after the target device has been set up for communication over the wireless network, and transmitting setup information for the wireless network from the target device to the another target device using a signal over power protocol.

5. The method of claim 1 wherein the different communication channel is further established by using visible light emitted from a lighting source on the target device, sound emitted from an audio speaker of the target device, or vibration caused by a vibration actuator of the target device, and wherein feedback information regarding status of enabling the target device to communicate with the smart device over the wireless network is sent by the target device over the different communication channel.

* * * * *